3,595,665
INHIBITION OF MOULD GROWTH ON CROPS
John Jackson Huitson, Banstead, and Peter William John Watts, Beddington, England, assignors to BP Chemicals (U.K.) Limited, London, England
Filed Dec. 11, 1967, Ser. No. 689,678
Claims priority, application Great Britain, Dec. 23, 1966, 57,698/66
Int. Cl. A23k 3/00
U.S. Cl. 99—8                                   11 Claims

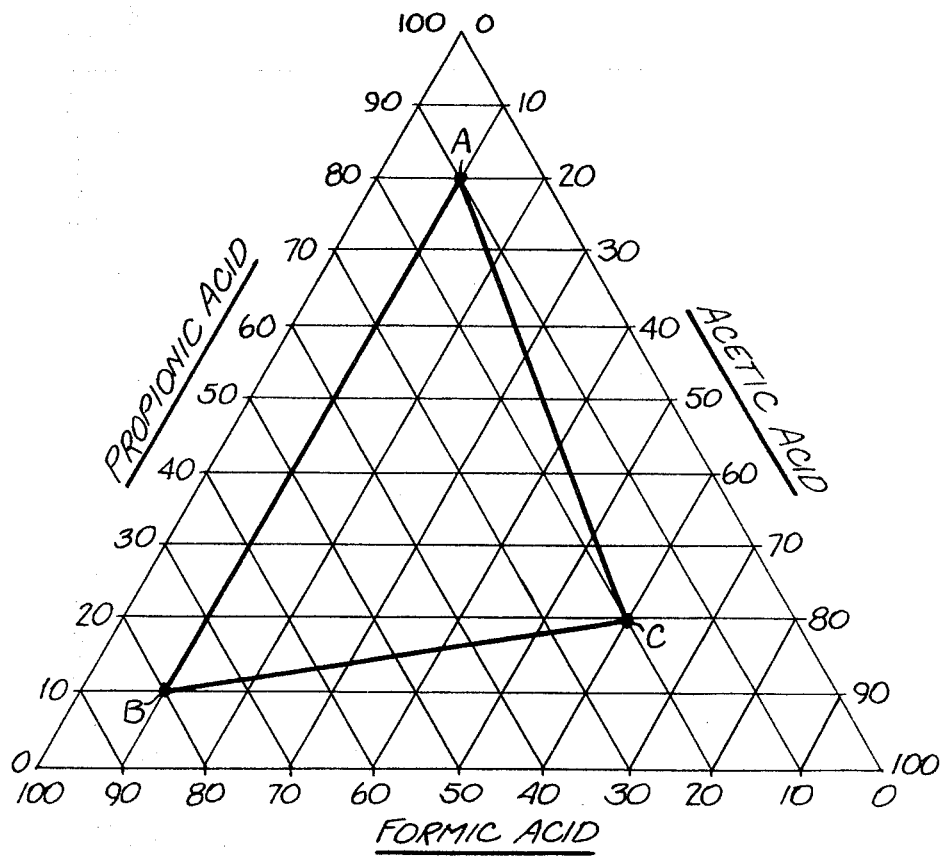
A = 10% FORMIC / 10% ACETIC / 80% PROPIONIC
B = 80% FORMIC / 10% ACETIC / 10% PROPIONIC
C = 20% FORMIC / 60% ACETIC / 20% PROPIONIC
INVENTORS
JOHN JACKSON HUITSON
PETER WILLIAM JOHN WATTS
BY
Ward, Haselton, McElvoney, Brooks & Fitzpatrick
ATTORNEYS US Patent Office
3,595,665
Patented July 27, 1971

ABSTRACT OF THE DISCLOSURE

Acetic acid, formic acid or binary and ternary mixtures of acetic, propionic and formic acids are used to prevent mould growth on crops and animal feedstuffs such as wheat and barley. The acid is preferably added in amounts 0.1 to 10% by weight of the dry crop, and may be added as an aqueous solution.

---

The present invention relates to a method for preventing the growth of mould in crops and animal feedstuffs during storage.

The present invention is a method for preventing the growth of mould in crops and animal feedstuffs which comprises treating the crop or feedstuff with a liquid containing a mould-inhibiting quantity of formic acid or acetic acid or a binary or ternary mixture of formic, acetic and propionic acids, wherein the amount of liquid added to the crop or animal feedstuff is not greater than 15% by weight of the dry crop or feedstuff, and the total water content of the crop after addition of the acid or acids is not greater than 50% by weight.

The acid may be added in solution if desired, preferably in aquoeus solution. By this means the bulk of solution is increased and a more even distribution of acid over the crop or feedstuff may be obtained. However, it is often convenient to add the acid without dilution.

It is found that if the amount of acid added to the crop is below a certain level there is a tendency for the growth of mould to be stimulated rather than inhibited. This level depends on various factors such as the temperature and moisture content of the crop. However, with higher levels of treatment the growth of mould is inhibited. With barley having a moisture content of 30%, the addition of acid in quantities of 0.3% or above by weight on the dry grain affords protection from mould growth at 23° C. The duration of the protection increases with increasing amounts of acid added and the desired amount to be added is that which will give protection for the required time, but it is preferred to use at least 0.1%. For many conditions amounts between 0.3 and 1.5% by weight of dry grain are mould inhibiting amounts for periods up to a year and it is believed that amounts of acid up to 10% by weight of dry grain will give considerable protection under most conditions.

It is found that in many cases mixtures of acids are more effective than individual acids. Particularly effective are binary mixtures of the following composition:

Formic/propionic: ratios between 10–70% formic acid 90–30% propionic
Formic/acetic: ratios between 50–90% formic acid 50–100% acetic
Acetic/propionic: ratios between 10–30% acetic acid 90–70% propionic and ternary compositions falling within the triangle on a triangular three phase diagram having the following vertices:

10% formic/10% acetic/80% propionic
80% formic/10% acetic/10% propionic
20% formic/60% acetic/20% propionic A preferred ternary composition is 50% propionic, 10 to 20% acetic and 40 to 30% formic acids.

The crops and animal feedstuffs which may be subjected to this treatment include for example wheat, oats, barley, rye, hay, maize, fish meal, groundnuts, soya beans, tick beans, sunflower seeds, rape seed and rice.

Cereal crops which have been harvested are frequently moved by means of an aguer. A convenient point at which the acid may be added is at the point of entry of the grain to the auger. If the acid is added in a stream at this point, the agitation of the grain by the auger is sufficient to provide adequate distribution of the acid.

The invention is further illustrated by the following examples in which the acid treatment levels are in all cases calculated on the moist grain taken for test:

EXAMPLE 1

Samples of barley, initially containing 13.4% moisture, were treated with aqueous solutions of acid mixtures to bring the acid content to 0.7% by weight calculated on the samples of moist grain taken, and the moisture content to 30% by weight. The mixtures were put in glass bottles and the contents tumbled.

| Acid mixture | Parts by weight | | |
|---|---|---|---|
|  | (a) | (b) | (c) |
| Propionic acid | 6 | 5 | 3 |
| Formic acid | 0 | 1 | 3 |

The treated samples were incubated at 23° C. and 100% relative humidity (R.H.) with the following results.

| Treatment | Observed mould growth after incubation (days) | | | | | |
|---|---|---|---|---|---|---|
|  | 33 | 34 | 35 | 41 | 44 | 49 |
| (a) | − | − | + | + | ++ | +++ |
| (b) | − | − | − | + | ++ | ++ |
| (c) | − | − | − | + | ++ | +++ |

Key: −=No growth; +=Light growth; ++=Moderate growth; +++=Heavy growth.

Untreated control samples containing 30% moisture developed light mould growth after 6 days, moderate mould growth after 17 days and heavy mould growth after 32 days.

EXAMPLE 2

Four samples each of barley and wheat were treated with 0.7% by weight calculated on the moist grain (of initial moisture contents, 13.4% and 16.7% respectively) of the following four acid mixtures by addition of the required amounts of aqueous solutions of the acid mixtures such that the moisture contents were raised to 30%.

| Acid mixture | Parts by weight | | |
|---|---|---|---|
|  | (a) | (b) | (c) |
| Formic acid | 20 | 30 | 40 |
| Acetic acid | 30 | 20 | 10 |
| Propionic acid | 50 | 50 | 50 |

The treated samples were incubated at 23° C. and 100% R.H. with the following results:

BARLEY

| Sample treatment: | Observed period of freedom from mould growth, days |
|---|---|
| (a) | 37 |
| (b) | 69 |
| (c) | 110 |

TABLE

| Acid mixture | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Composition (percent): | | | | | | | | | | | | | | | | |
| Formic acid | 100 | 80 | 60 | 40 | 20 | 20 | 30 | 40 | | 10 | 25 | 20 | 50 | 30 | 75 | 40 |
| Acetic acid | | 10 | 20 | 30 | 40 | 60 | 40 | 20 | | 10 | | 20 | | 30 | | 40 |
| Propionic acid | | 10 | 20 | 30 | 40 | 20 | 30 | 40 | 100 | 80 | 75 | 60 | 50 | 40 | 25 | 20 |
| Days: | | | | | | | | | | | | | | | | |
| Light mould | 144 | 168 | 80 | 108 | 101 | 97 | 136 | 122 | 119 | 173 | 87 | 181 | 116 | 175 | 46 | 116 |
| Moderate mould | 147 | 171 | 108 | 161 | 108 | 150 | 147 | 144 | 122 | 175 | 154 | 201 | 150 | 181 | 67 | 133 |
| Heavy mould | 150 | 173 | 161 | 173 | 133 | 185 | >250 | 147 | 133 | 181 | 161 | | 154 | 185 | 103 | 168 |

WHEAT

| Sample treatment: | Observed period of freedom from mould growth, days |
|---|---|
| (a) | 32 |
| (b) | 70 |
| (c) | 95 |

Untreated control samples containing 30% moisture became mouldy after 6 days storage.

EXAMPLE 3

Samples of barley were treated with 0.7% calculated on the moist grain (initial moisture content 13.4%) of the following acids and acid mixtures by addition of the required amounts of aqueous solutions of the acids and acid mixtures such that the moisture contents of the barley samples were raised to 30%.

| Acid or acid mixture | Parts by weight | | | | |
|---|---|---|---|---|---|
| | (a) | (b) | (c) | (d) | (e) |
| Formic acid | 100 | | 50 | 20 | 25 |
| Acetic acid | | 100 | 50 | 72.5 | 25 |
| Propionic acid | | | | 7.5 | 50 |

All the treated samples were stored in sealed glass bottles at 23° C. The samples occupied about ⅓ of the available space in the bottles, thus ensuring that adequate oxygen was present for mould growth. Periodic opening of the bottles for inspection throughout the duration of the test provided further opportunity for atmospheric change to take place. All samples were still observed to be completely free from mould growth after a period of 13 months. An untreated control sample, also containing 30% moisture and stored in a sealed glass bottle, was observed to develop light mould growth after 11 days, moderate mould growth after 18 days and heavy mould growth after 39 days.

Moisture contents of the samples were redetermined after 13 months and were found to be:

(a) 24%
(b) 26%
(c) 16.5%
(d) 23.5%
(e) 14.25%

EXAMPLE 4

The following table illustrates the relative antifungal performance of a number of acid mixtures under accelerated conditions. Samples of barley, initially containing 25% moisture were treated with 0.5% w./w., based on the moist barley weight, of the acid mixtures, all of which were applied as neat acid. The acid mixtures were thoroughly distributed over the grain samples by tumbling in glass bottles for several hours. The grain samples were then transferred to glass petri-dishes and placed in sealed glass beakers in an atmosphere of 100% R.H. and at 23° C. The results are given in the following table:

A diagram of a triangular 3 phase system whose vertices are the parameters

10% formic/10% acetic/80% propionic
80% formic/10% acetic/10% propionic
20% formic/60% acetic/20% propionic is shown in the accompanying drawing.

We claim:

1. A method for preventing the growth of mold in crops and animal feedstuffs which comprises treating the crop or feedstuff with a liquid containing a mold-inhibiting quantity of formic acid or a binary or ternary mixture of formic, acetic and propionic acids, wherein the amount of liquid added to the crop or animal feedstuff is not greater than 15% by weight of the dry crop or feedstuff, and the total water content of the crop after addition of the acid or acids is not greater than 50% by weight in the dry crop or feedstuff and thereby inhibiting mold growth.

2. A method according to claim 1, wherein the acid is added in aqueous solution.

3. A method according to claim 1 wherein the amount of acid added is between 0.1 and 10% by weight of dry crop or feedstuff.

4. A method according to claim 3 wherein the amount of acid added is between 0.3 and 1.5% by weight of the dry crop or feedstuff.

5. A method according to claim 1, wherein the crop of animal feedstuff subjected to the treatment is wheat, oats, barley, rye, hay, maize, fish meal, groundnuts, soya beans, sunflower seed, rape seed or rice.

6. A method according to claim 1 wherein a mixture of 10–70% formic and 90–30% propionic acids is used.

7. A method according to claim 1 wherein a mixture of 50–90% formic and 50–10% acetic acid is used.

8. A method according to claim 1 wherein a mixture of 10–30% acetic and 90–70% propionic acid is used.

9. A method according to claim 1 wherein a mixture of formic, acetic and propionic acids is used whose composition falls within the triangle whose vertices are the three parameters:

(i) 10% formic/10% acetic/80% propionic acid
(ii) 80% formic/10% acetic/10% propionic acid
(iii) 20% formic/60% acetic/20% propionic acid on a triangular three phase diagram.

10. A method according to claim 9 wherein a mixture comprising 50% propionic acid, 10 to 20% acetic and 40–30% formic acid is used.

11. A method according to claim 1 wherein a mixture of formic, acetic, and propionic acids is used whose composition lies within the area defined by:
  (i) a line joining the point 10% formic/10% acetic/80% propionic acid to the point 80% formic/10% acetic/10% propionic acid;
  (ii) a line joining the said point 80% formic/10% acetic/10% propionic acid to the point 20% formic/60% acetic/20% propionic acid;
  (iii) a line joining the said point 20% formic/60% acetic/20% propionic acid to the point 30% formic/40% acetic/30% propionic acid; and
  (iv) a line joining the said point 30% formic/40% acetic/30% propionic to the said point 10% formic/10% acetic/80% propionic acid
on a triangular three phase diagram.

References Cited

UNITED STATES PATENTS

| | | | |
|---|---|---|---|
| 2,154,449 | 4/1939 | Hoffman et al. | 99—153 |
| 2,552,059 | 5/1951 | Pfuetzek et al. | 99—8 |
| 2,898,372 | 8/1959 | Anderson | 99—224 |
| 3,057,731 | 10/1962 | Fröman | 99—224 |
| 1,281,828 | 10/1918 | Pierson | 99—80 |
| 2,965,488 | 12/1960 | Belasco | 99—2 |

NORMAN YUDKOFF, Primary Examiner

C. P. RIBANDO, Assistant Examiner

U.S. Cl. X.R.

99—2, 150, 153, 224; 252—407